Figure 1:
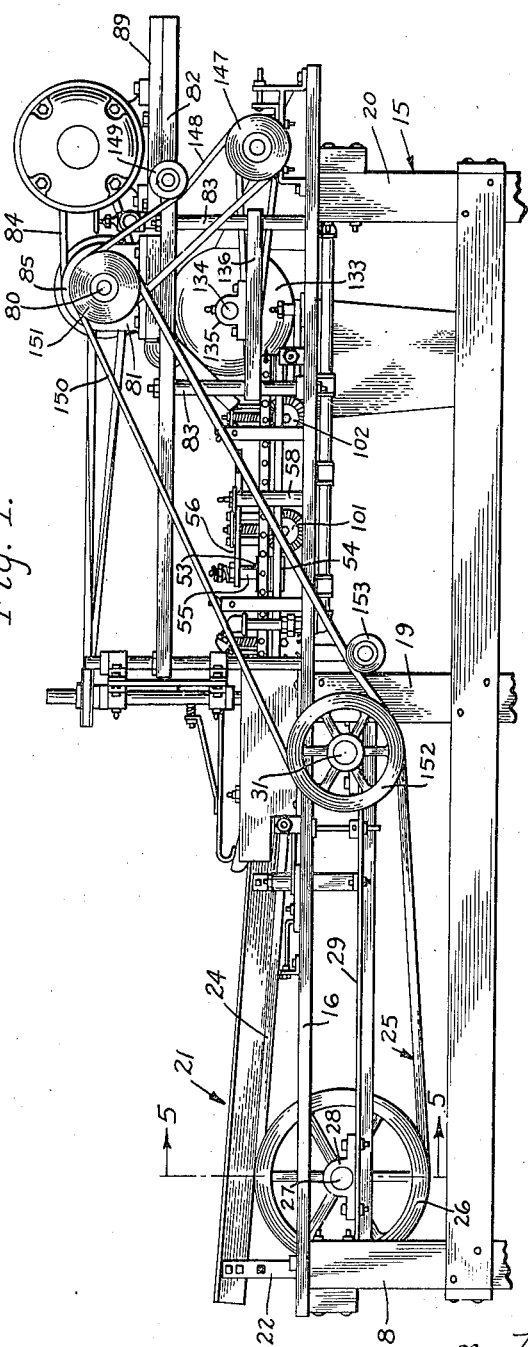

April 5, 1949.  E. RIVERS  2,466,614

FISH SLICING AND CLEANING MACHINE

Filed Dec. 9, 1946  5 Sheets-Sheet 1

Inventor
EMIL RIVERS
By Kimmel & Crowell
Attorneys

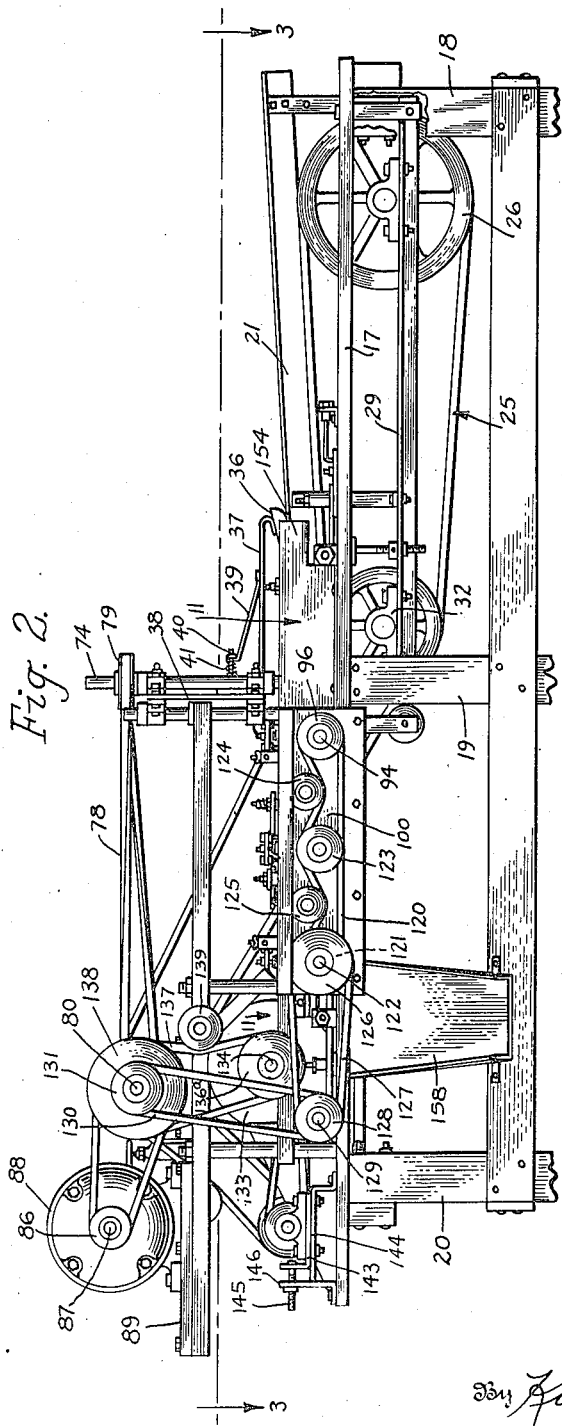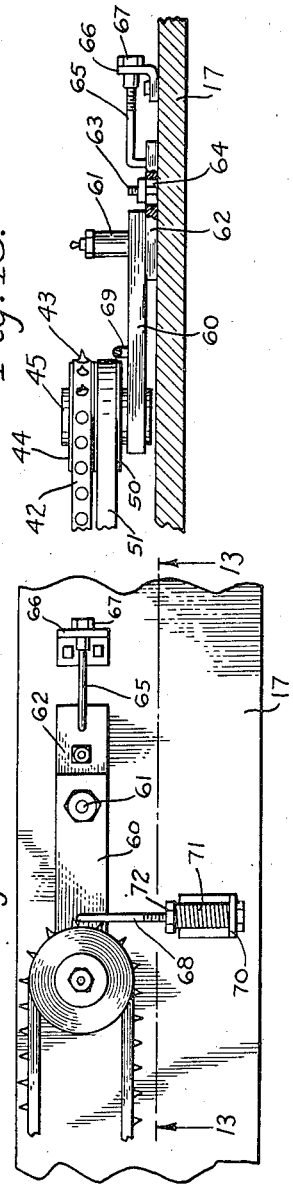

April 5, 1949.  E. RIVERS  2,466,614
FISH SLICING AND CLEANING MACHINE
Filed Dec. 9, 1946  5 Sheets-Sheet 3
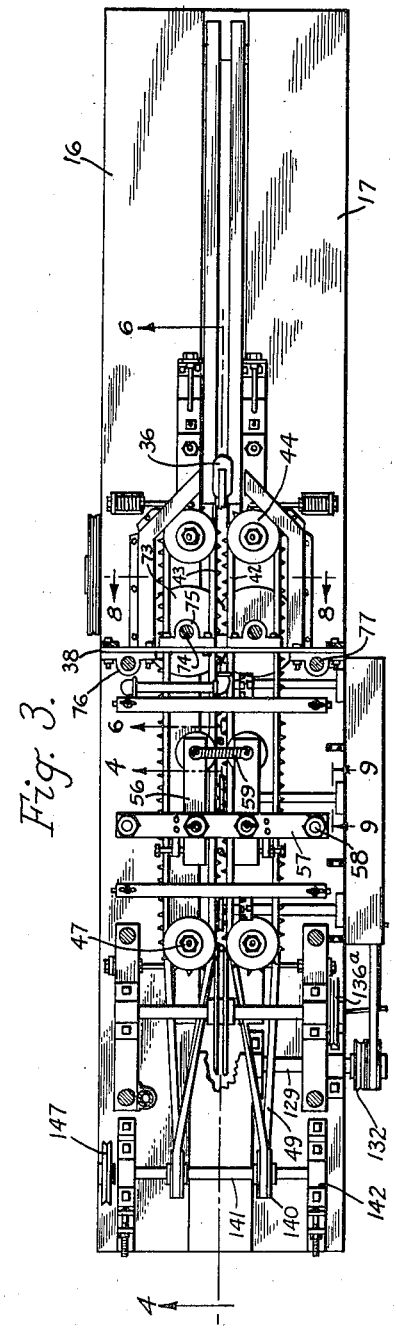
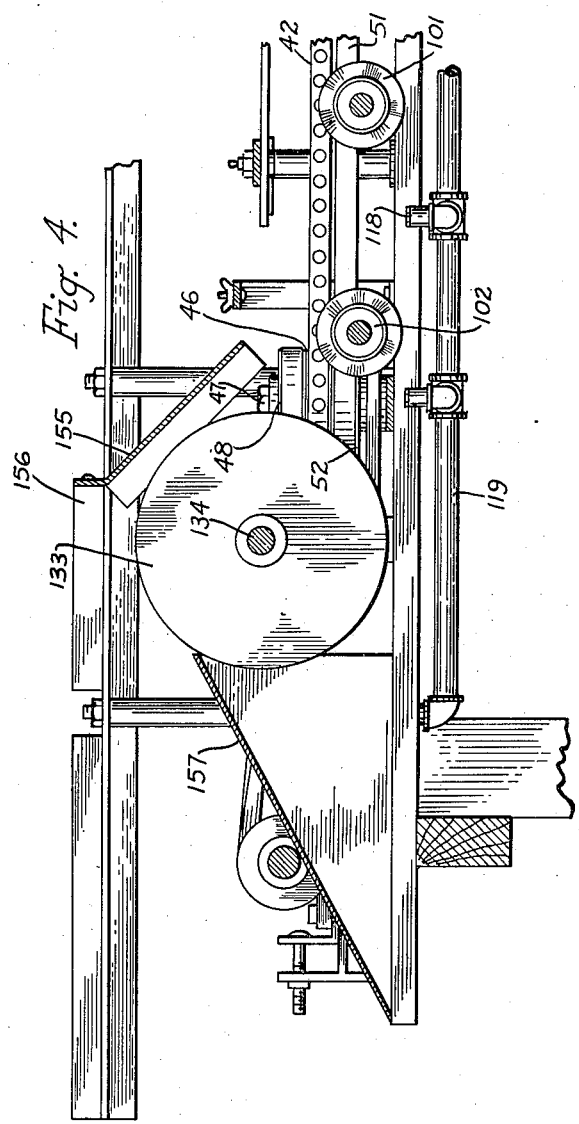
Inventor
EMIL RIVERS
By Kimmel & Crowell
Attorneys April 5, 1949. E. RIVERS 2,466,614
FISH SLICING AND CLEANING MACHINE
Filed Dec. 9, 1946 5 Sheets-Sheet 4

Inventor
EMIL RIVERS
By Kimmel & Crowell
Attorneys

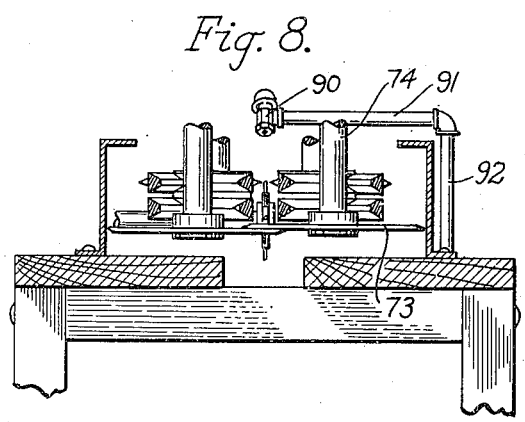
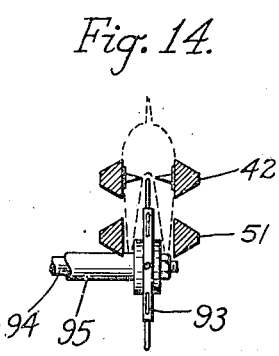
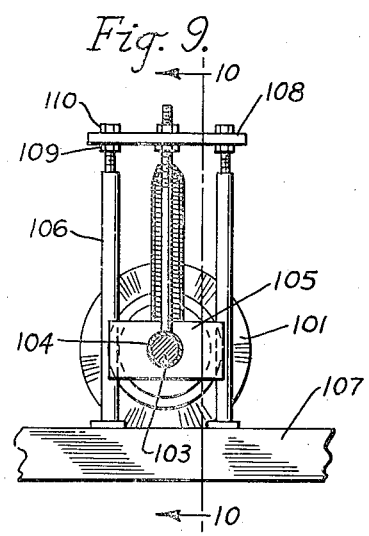
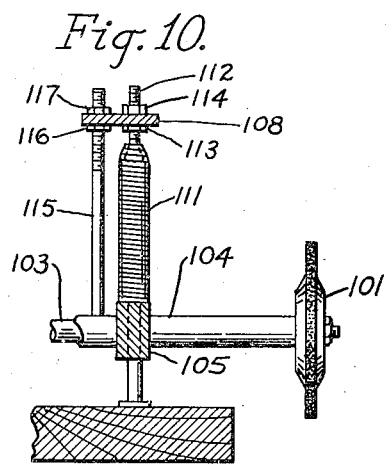
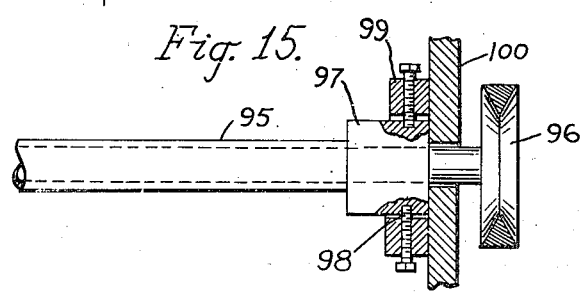

Patented Apr. 5, 1949

2,466,614

UNITED STATES PATENT OFFICE 2,466,614

FISH SLICING AND CLEANING MACHINE

Emil Rivers, Rockland, Maine

Application December 9, 1946, Serial No. 715,022

3 Claims. (Cl. 17—3)

This invention relates to a fish slicing and cleaning machine.

An object of this invention is to provide a machine which will progressively clean and slice fish.

Another object of this invention is to provide a machine of this kind which will operate on fish of different sizes.

A further object of this invention is to provide a machine which will open the fish by cutting a slice through the belly which is lowermost so that irrespective of the size of the fish, the belly will have the same cut through it.

A further object of this invention is to provide a machine of this kind having adjustable carrier belts which will automatically adjust themselves to the thickness of the fish.

In the machine to be hereinafter described, the fish are placed in a trough at the rear of the machine, and the fish initially have the heads removed. A carrier belt moves the fish through the forward end of the trough where the fish are gripped on the opposite sides thereof by a pair of carrier belts having projecting pins so that the fish will be firmly held between the belts. As the fish moves forwardly, a pair of rotary cutters cut off a slice from the belly which is lowermost and then rotary toothed wheels and brushes remove the insides of the fish while at the same time the opened fish is sprayed with water. The cutting of a slice from the belly exposes the innards, which are now loosened, and after contact with the first toothed wheel the major portion of the innards is removed. The remaining portions of the innards are subjected to the water spray and the brushes, so that by the time the fish has passed the cleaning zone a thorough job of cleaning has been done. After the fish has passed the cleaning zone, it is moved past slicing or fillet cutters where the cleaned fish is cut lengthwise and the slices are then discharged at the forward end of the machine.

With the above and other objects in view, my invention consists in the arrangement, combination and details of construction disclosed in the drawings and specification, and then more particularly pointed out in the appended claims.

Figure 11:
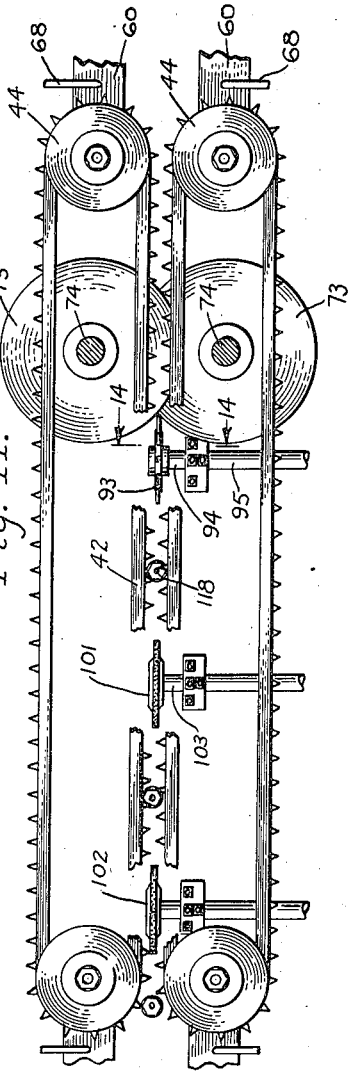
Figure 7:
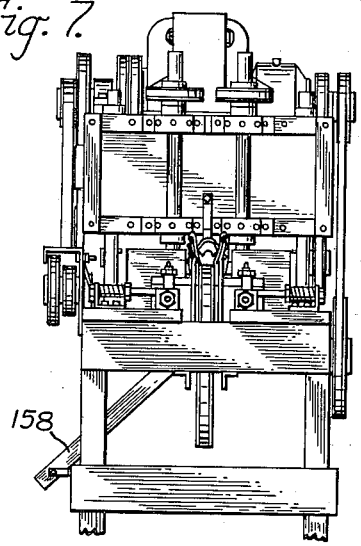
Figure 5:
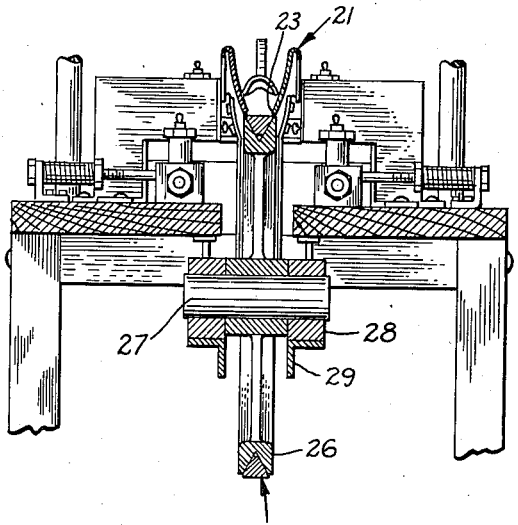
Figure 6:
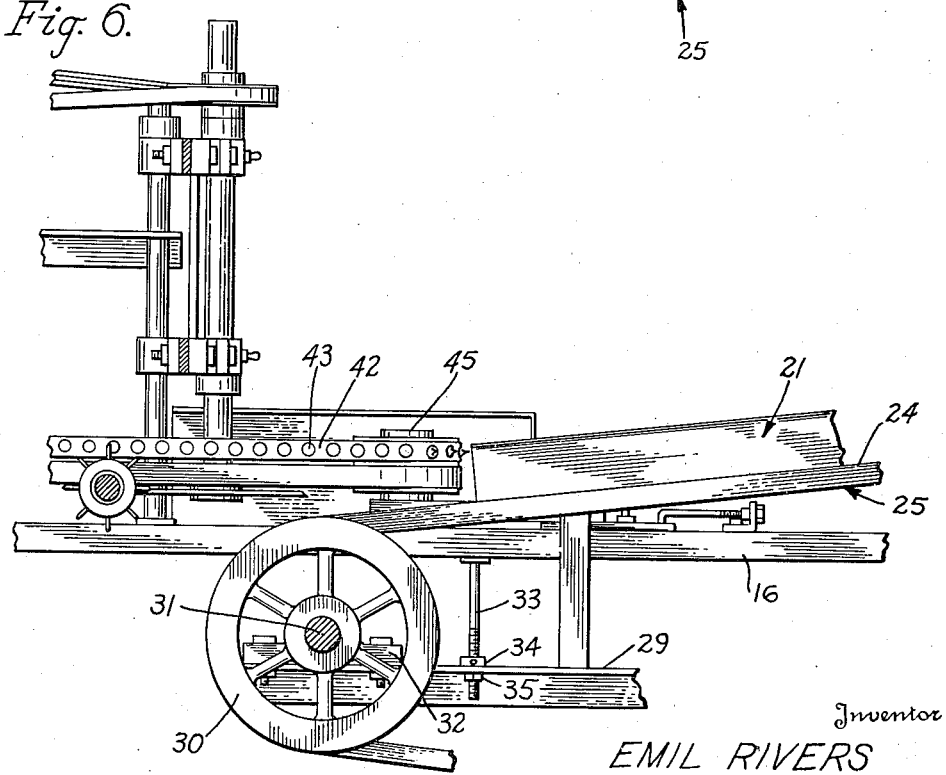

In the drawings,

Figure 1 is a detail side elevation of a fish slicing and cleaning machine constructed according to an embodiment of this invention, Figure 2 is a detail side elevation of the machine opposite from that shown in Figure 1, Figure 3 is a sectional view taken on the line 3—3 of Figure 2, Figure 4 is a fragmentary sectional view taken on the line 4—4 of Figure 3, Figure 5 is a fragmentary sectional view taken on the line 5—5 of Figure 1, Figure 6 is a fragmentary sectional view taken on the line 6—6 of Figure 3, Figure 7 is a detail rear end elevation of the device, Figure 8 is a fragmentary sectional view taken on the line 8—8 of Figure 3, Figure 9 is a fragmentary sectional view taken on the line 9—9 of Figure 3, Figure 10 is a fragmentary sectional view taken on the line 10—10 of Figure 9, Figure 11 is a fragmentary sectional view taken substantially on line 11—11 of Figure 2, Figure 12 is a fragmentary plan view of the forward end of one of the flexible carrier belts and the mounting therefor, Figure 13 is a sectional view taken substantially on the line 13—13 of Figure 12, Figure 14 is a fragmentary sectional view taken on the line 14—14 of Figure 11, Figure 15 is a fragmentary plan view, partly in section, of the cleaner shaft and support structure.

Referring to the drawings, the numeral 15 designates generally a supporting frame structure which includes horizontally disposed longitudinally extending top plates 16 and 17 which are secured to the upper ends of supporting posts 18, 19 and 20. The fish which are to be operated upon by this machine are first placed in an elongated downwardly and inwardly inclined trough generally designated as 21. The trough 21 is formed of an elongated channel shaped sheet metal member which is supported by means of supporting brackets 22 secured to the top members 16 and 17.

The trough 21 is provided with an elongated slot 23 which extends inwardly from a point spaced from the rear end of the trough and the upper run 24 of an endless belt forms the movable bottom for the trough in order to move the fish lengthwise and inwardly of the trough. The belt 25 is trained over a rear idler wheel 26 mounted on a shaft 27 which is journaled in bearings 28. The bearings 28 are supported on horizontally disposed angle shaped supporting bars 29 which are secured between the posts 18 and 19.

The forward end of the belt 25 is trained over a driving wheel or pulley 30 which is fixed on a shaft 31 journaled in bearings 32. The bearings 32 are fixed to the inner end portions of the supporting bars 29 and these supporting bars at their inner portions are supported from the top members 16 and 17 by depending supporting rods or bolts 33 which are fixed at their upper ends to the top members 16. The rods or bolts 32 extend through the horizontal sides of the angle members 29 and are locked in adjusted position by means of lock nuts 34 and 35, as shown in Figure 6.

As the fish moves downwardly through the trough 21 and reaches substantially the inner end of this trough, the back of the fish is engaged by a transverse curved presser member 36 which is carried by an elongated resilient supporting arm 37 and the supporting arm 37 is fixed at its inner end to an upright support 38 which is fixed in upright position to the top members 16 and 17. The arm 37 is adapted to be tensioned by means of an upwardly and inwardly inclined bar 39 which is fixed to the arm 37 forwardly from the rear end thereof and engages a bolt 40 about which a spring 41 is mounted.

After the fish passes beneath the depressing member 36, the fish on the opposite sides thereof is gripped between the inner runs of a pair of conveyer belts 42. The belts 42 have pins 43 on their outer sides so that these pins 43 will be in confronting position on the inner runs of the belts and will pierce the sides of the fish and thereby forcibly move the fish forwardly to the forward end of the machine. The belts or conveyer members 42 at their forward end are trained about pulleys 44 which are rotatably carried by stud shafts 45. The belts 42 extend forwardly in a horizontal position and at their forward ends are trained about driving pulleys 46 carried by shafts 47.

The shafts 47 also have mounted thereon driving pulleys 48 about which driving belts 49 are trained. The shaft 45 has loosely mounted thereon an idler pulley 50 disposed below the pulley 44 about which a belt 51 is trained. The belt 51 at the forward end is trained about a pulley 52 fixed on the shaft 47 below the pulley 46. The belt 51 does not have the spikes or pins 43 mounted thereon and is adapted to provide additional means for firmly holding the fish in an upright position as the fish is moved through the machine. The belts 42 and 51 also engage intermediate pulleys 53 and 54 respectively, which are rotatably carried by a depending shaft 55. The shaft 55 is carried by a horizontal swingable supporting bar 56 which is swingably supported from a transversely extending horizontal bar 57 fixed between upright supporting posts 58. The rear or free ends of the supporting bars 56 are constantly urged toward each other by means of a contractile spring 59. In this manner the inner operative runs of the belts 42 and 51 are maintained in substantially parallel relation, particularly at the points where the fish is being engaged by the inside cleaning elements.

The stub shafts 45 are each mounted on an elongated bar 60 which at its rear end is pivotally mounted on a pivot member 61 carried by a belt tensioning bar 62. The bar 62 has a bolt 63 extending through an elongated slot 64 and the bolt 63 engages through the top members 16 and 17. The bar or plate 62 is adjusted endwise by means of an L-shaped belt tensioning bolt 65 which extends through an angle member 66. One or more nuts 67 are threaded on the bolt 65 so that the belts 42 and 51 may be maintained taut.

The shaft supporting bar 60 is maintained in the desired position for firm contact of the belts 42 and 51 with the side of the fish by means of a spring tensioned bar 68. The bar 68 at its inner end is formed with a downturned portion 69 which may be pivotally engaged with the bar 60 at the horizontally outwardly extending portion of the bolt 68 extending through an upright angle member 70 fixed to the upper side of the top members 16 and 17.

A spring 71 is disposed about the bolt 68 and bears at its outer end against the angle member 70. A spring tensioning nut 72 is threaded on the bolt 68 and bears against the spring 71. In this manner the conveyer belts 42 and 51 are yieldably supported at their rear ends so that fish of different thicknesses may be engaged by the belts without damage or injury to the fish.

When the fish is gripped between the conveyer belts 42 and 51 after having passed the depresser 36, the fish is moved forwardly and passes a pair of rotary cutters 73 carried by vertically disposed shafts 74 journaled in bearings 75. The bearings 75 are carried by the vertical supporting member 38 which is fixed by vertically adjustable mountings 76 to vertical posts or stationary shafts 77 carried by the tops 16 and 17. The shafts 74 are rotated by means of driving belts 78 engaging pulleys 79 mounted on the upper ends of the shafts 74, and also engaging pulleys mounted on a countershaft 80 supported by bearings 81.

The bearings 81 are mounted on upper horizontal frame bars 82 which are carried by upright supporting posts 83. The shaft 80 is driven by means of a belt 44 which is trained about a pulley 85 fixed on the shaft 80, and also trained about a motor pulley 86 fixed to a motor shaft 87 and rotated by a motor or power member 88. The motor or power member 88 is supported on a platform 89 secured between the supporting bars 82. The rotary cutters 73 are disposed in overlapping relation at their inner portions, substantially centrally between the inner runs of the belts 42 and 51 and being positioned below the lower belt 51, are adapted to cut a slice from the belly of the fish which projects below the lower belt 51.

A spray nozzle 90 is disposed above the runs of the upper belts 42, slightly forward of the cutters 73, for discharging a water spray on the fish to clean the outer sides of the fish. The nozzle 90 is connected to a horizontally disposed pipe 91 which is also connected to a vertical pipe 92 and the latter is adapted to be connected to a suitable source of water supply. The innards of the fish are removed after a slice has been cut from the belly thereof by means of a toothed wheel 93 which is mounted on a rotatable shaft 94. The shaft 94 is journaled through a bearing sleeve 95 which extends laterally of the conveyer belts and has a pulley 96 mounted on the outer ends thereof.

The bearing sleeve 95 has mounted on the outer end portion thereof a bushing 97 which is rockably supported on a pair of pivot bolts 98 extending through a plate 99 which is fixedly secured to a vertical side plate 100. A pair of longitudinally spaced apart brushes 101 and 102 extend forwardly from the toothed wheel 93 and these brushes are mounted in the same manner as the wheel 93. Each brush is mounted on a shaft 103 (Fig. 10), journaled through a bearing sleeve 104. The outer end of the bearing sleeve 104 is mounted in the same manner as the outer end of the sleeve 95, shown in Figure 15.

The sleeve 104 is yieldably supported between the ends thereof by means of a vertically adjustable and spring tensioned bearing block 105 which is vertically slidable between a pair of vertically disposed guide rods 106 secured to a lengthwise extending supporting bar 107. The supporting bars 106 have extending between the upper ends thereof a horizontal connecting bar 108 which is vertically adjusted by means of adjusting nuts 109 and 110 (see Fig. 9). A spring 111 is disposed between the supporting bar 108 and the bearing block 105, having secured to its upper end a bolt 112 which is vertically adjusted by means of nuts 113 and 114. The lower end of the spring 111 is fixed in any suitable manner to the block 105 so that the spring 111 will normally urge or pull the bearing sleeve 104 upwardly.

A stop bar or rod 115 is dependent from the connecting bar 108, being vertically adjustable by means of adjusting lock nuts 116, 117. The lower end of the rod 115 is adapted to engage the bearing sleeve 104, the sleeve being held against the rod 115 by means of the spring 111. In this manner the cleaning wheels or brushes are resiliently urged upwardly, but may swing downwardly so that these brushes and cleaner members will be self adjusting, to provide for the cleaning of different sizes of fish.

The mounting for the toothed wheel 93 and the bearing sleeve 95 is identical with the construction shown in Figures 9 and 10 for the brush members 101 and 102. As the fish, which is open at the lower side or belly thereof, moves past the brushes 101, 102, the inside of the fish is sprayed with water or other cleaning fluid which is discharged from spaced nozzles 118 which are connected to a supply pipe 119 disposed beneath the conveyer members. The brushes or cleaning members are rotated by means of an endless belt 102 which is trained about a driving pulley 121 carried by the brush shaft 122 on which the brush 102 is mounted.

The shaft 103 has a pulley 123 secured thereto and the pulley 123, being disposed between the pulleys 96 and the pulley 121, is rotated in a direction opposite from the rotation of pulley 121 by disposing a pair of idler pulleys 124 and 125 on opposite sides of the pulley 123 so that the idler pulleys 124 and 125 will press the upper run of the belt 120 downwardly into driving engagement with the pulley 123. The shaft 122 also has fixed thereto a pulley 126 about which a belt 127 is trained and the belt 127 is also trained about a pulley 128 carried by a lower countershaft 129. The countershaft 129 is operatively connected with the upper countershaft 80 through a belt 130 engaging over the upper pulley 131 carried by the upper shaft 80 and a corresponding lower pulley 132 (Fig. 3) mounted on the shaft 129.

When the now cleaned fish passes the last cleaning brush 102, it is moved past a rotary fillet member or cutter 133 carried by a shaft 134 which is journaled in bearings 135. The bearings 135 are mounted on a supporting bar 136 fixed between a pair of uprights 83. The shaft 134 has fixed thereon a pulley 136a about which a belt 137 is trained and the belt 137 is also trained about a pulley 138 fixed on the upper counter shaft 80. An idler pulley 139 engages one run of the belt 137 so as to maintain this belt taut.

The belts 49 which drive the conveyer belts are trained about pulleys 140 mounted on a forward countershaft 141. The countershaft 141 is journaled through a pair of bearings 142 carried by a horizontally adjustable plate 143. The plate 143 is horizontally adjustable on a supporting bar 144, being adjusted by means of an adjusting nut 145 extending through a vertical ear 146. The shaft 141 has a pulley 147 fixed thereon and a belt 148 is trained about the pulley 147 and engages a pulley mounted on the upper shaft 80. An idler pulley or belt tensioner 149 engages one run of the belt 148 to maintain this belt in a taut condition.

The conveyer 25 is operated from the upper shaft 80 by means of a belt 150 which is trained about a pulley 151 on the shaft 80 and about a pulley 152 mounted on the shaft 31. An idler pulley 153 engages the lower run of the belt 150 and maintains this belt taut. The rear ends of the conveyer members 42 and 51 are shielded by means of rearwardly extending shields 154 which extend from the supporting member 38. The fillet cutter 133 has disposed thereover a shield 155 carried by a support 156 and a forward downwardly and forwardly extending shield 157 engages the forward portion of the cutter 133 so that the operator of this machine will not be able to come into direct contact with the fillet cutter 133. After the fish has been lengthwise split by means of the cutter 133, the fish will leave the forward ends of the conveyer members 42 and 51, and will then drop downwardly onto a chute 158 and will pass from the chute 158 into a suitable receiver.

In the use and operation of this machine the fish initially has the head and tail removed and is then inserted in the rear end of the trough 21 with the fish in normally upright position. When the fish contacts with the rear conveyor 25 it is pulled forwardly until it engages the open forward ends of the conveyers 42 and 51. The spikes or pins 43 will pierce the flesh of the fish so that the fish cannot slip relative to the conveyor belts and the lower belt 51 will hold the fish in upright position. The fish will pass over the first cutter 73 where the belly of the fish will be sliced off leaving the inside open and, after passing the belly, cutters 73 and toothed wheel 93 will enter the inside of the fish and remove the innards. The fish will then pass forwardly where the spray nozzles 118 will spray water or other fluid into the inside of the fish, and moving forwardly the brushes 101 and 102 will progressively engage inside the fish to thoroughly clean the inside. When the fish has passed the last cleaning brush 102 it will contact the fillet cutter or splitting member 133 which will lengthwise cut the fish through the back thereof. The sliced pieces of the fish will then drop from the forward ends of the conveyers 42 and 51 and slide downwardly through the chute 158.

I do not mean to confine myself to the exact details of construction herein disclosed but claim all variations falling within the purview of the appended claims.

What I claim is:

1. A fish cleaning and slicing machine comprising a frame, conveyor means for moving the fish in a horizontal path with the belly of the fish in a lower projecting position, said conveyor means including pairs of conveyor belts disposed with the inner runs thereof in parallel laterally spaced apart relation, mounting means yieldably and adjustably supporting said belts for accommodating varying sizes of fish, means disposed below said conveyor means for cleaning the fish as it moves along the horizontal path, and mounting means for yieldably and adjustably securing said cleaning means to said frame, said mounting means including a pair of spaced apart vertically extending guide rods fixed to said frame, a bearing block rotatably carrying said cleaning means and slidably supported between said guide rods, a horizontal connecting bar carried at the top of said guide rods for vertical adjustment relative thereto, spring means connected at one end thereof to said connecting bar and at the other end thereof to said bearing block for constantly urging said bearing block upwardly, and vertically adjustable stop means engaging between said connecting bar and said bearing block for limiting the upward travel of said block, whereby the position of said cleaning means may be adjusted to accommodate varying sizes of fish.

2. A fish cleaning and slicing machine comprising a frame, conveyor means for moving the fish in a horizontal path with the belly of the fish in a lower projecting position, said conveyor means including pairs of conveyor belts disposed with their inner runs in parallel laterally spaced apart relation, each of said conveyor belts being trained about a forward and rear pulley, laterally yieldable and longitudinally adjustable mounting means for supporting each of said pulleys on said frame and accommodating said conveyor means to fish of varying sizes, said mounting means including a vertically extending pulley shaft carried by one end of a horizontally swingable bar, the other end of said bar being pivotally mounted on a belt tensioning member carried by said frame for longitudinal adjustment relative thereto, spring means connected to said frame and to said bar for constantly urging said shaft towards the center of said frame, and means for adjusting the tension of said spring means whereby said inner runs of said conveyor belts are laterally yieldable and adjustable relative to said frame.

3. A fish cleaning and slicing machine comprising a frame, conveyor means for moving the fish in a horizontal path with the belly of the fish in a lower projecting position, said conveyor means including pairs of conveyor belts disposed with their inner runs in parallel laterally spaced apart relation, each of said belts being trained about a forward and rear pulley, laterally yieldable and longitudinally adjustable mounting means for supporting said pulleys on said frame and accommodating said conveyor means to fish of varying sizes, said mounting means including a pair of forward and a pair of rear vertically extending pulley shafts for carrying said pulleys, each of said shafts being mounted at one end of a horizontally swingable bar, the other end of each of said bars being pivotally carried by a plate slidably mounted on said frame, means engaging said frame and said plate for longitudinally adjusting said plate relative to said frame, and spring means for constantly urging said one end of each of said bars toward the center of said frame, said spring means including a member secured to said frame, threaded means fixed to said bar, a coil spring disposed about said threaded means and having one end thereof abutting against said member, and means on said threaded means for abutting against the other end of said coil spring for adjusting the tension thereof.

EMIL RIVERS.

REFERENCES CITED

The following references are of record in the file of this patent:

UNITED STATES PATENTS

| Number | Name | Date |
|---|---|---|
| 676,073 | Munn et al. | June 11, 1901 |
| 848,450 | Deloe | Mar. 26, 1907 |
| 1,134,530 | Haubner | Apr. 6, 1915 |
| 1,179,101 | Hendricks et al. | Apr. 11, 1916 |
| 1,217,809 | Nicholson | Feb. 27, 1916 |
| 1,224,923 | Haubner | May 8, 1917 |
| 2,142,420 | Sullivan | Jan. 3, 1939 |
| 2,311,176 | Hutton | Feb. 16, 1943 |

FOREIGN PATENTS

| Number | Country | Date |
|---|---|---|
| 11,841 | Great Britain | 1913 |